US006985977B2

(12) United States Patent
Vrancic

(10) Patent No.: US 6,985,977 B2
(45) Date of Patent: Jan. 10, 2006

(54) SYSTEM AND METHOD FOR TRANSFERRING DATA OVER A COMMUNICATION MEDIUM USING DOUBLE-BUFFERING

(75) Inventor: Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 81 days.

(21) Appl. No.: 10/231,538

(22) Filed: Aug. 30, 2002

(65) Prior Publication Data

US 2004/0044811 A1 Mar. 4, 2004

(51) Int. Cl.
*G06F 3/00* (2006.01)
*G06F 13/28* (2006.01)
*G06F 3/06* (2006.01)

(52) U.S. Cl. .............................. 710/59; 710/61; 710/53; 710/58; 710/60; 710/57; 710/5; 710/6; 710/22; 710/25; 710/28

(58) Field of Classification Search ................... 710/52, 710/53, 57, 22, 23, 24, 25, 305, 306, 56, 710/58–61; 711/220; 701/33; 358/115
See application file for complete search history.

(56) References Cited

U.S. PATENT DOCUMENTS 4,908,748 A * 3/1990 Pathak et al. ............... 711/220
5,150,456 A * 9/1992 Wu et al. .................. 358/1.15
5,659,749 A 8/1997 Mitchell et al.
5,664,092 A 9/1997 Waites
5,678,063 A 10/1997 Odom et al.
5,686,917 A 11/1997 Odom et al.
5,748,916 A 5/1998 Conway et al.
5,842,006 A 11/1998 Harvey et al.
5,889,480 A 3/1999 Kim
6,009,363 A * 12/1999 Beckert et al. ............... 701/33
6,145,045 A 11/2000 Falik et al.
6,640,312 B1 10/2003 Thomson et al.
6,711,647 B1 * 3/2004 Holehan ..................... 710/306
2003/0236938 A1 * 12/2003 Bennett ...................... 710/305

* cited by examiner

*Primary Examiner*—Jeffrey Gaffin
*Assistant Examiner*—Joshua D. Schneider
(74) *Attorney, Agent, or Firm*—Meyertons Hood Kivlin Kowert & Goetzel, P.C.; Jeffrey C. Hood; Mark S. Williams

(57) ABSTRACT

System and method for transferring data to a device using double buffered data transfers. A host computer system couples to a data acquisition device. The device includes a first read buffer and a second read buffer for storing output data received from the host computer. The device reads first data from the computer and stores it in the first read buffer. The first data is transferred out from the first read buffer while the device reads second data from the computer and stores it in the second read buffer. The second data is transferred out from the second read buffer (after the transfer of the first data) while the device reads third data from the host computer and stores the third data in the first read buffer. Thus, the data acquisition device successively reads data into one read buffer concurrently with transferring data out from the other buffer, respectively.

36 Claims, 13 Drawing Sheets

SYSTEM AND METHOD FOR TRANSFERRING DATA OVER A COMMUNICATION MEDIUM USING DOUBLE-BUFFERING

BACKGROUND OF THE INVENTION

1. Field of the Invention

This invention relates to data communications and data delivery over communication media, and, more particularly, to host computer based data acquisition systems.

2. Description of the Relevant Art

IEEE 1394 is an international standard, low-cost digital interface that integrates entertainment, communication, and computing electronics into devices such as multimedia devices. Originated by Apple Computer as a desktop LAN and developed by the IEEE 1394 working group, IEEE 1394 is a hardware and software standard for transporting data at 100, 200, 400, or 800 megabits per second (Mbps). Maximum packet sizes are 512, 1024, 2048, and 4096 bytes depending on the transfer speed. 1394 provides 64-bit addressing—The 16 MSb's (most significant bits) are used for determining source/destination bus/node. As used herein, the terms "node" and "device" may be used interchangeably to denote a node on the 1394 bus.

There can be up to 1023 buses each with up to 63 nodes. The 48 LSb's (least significant bits) are used to access locations within a device's addressing space. 1394 provides for Direct Memory Access (DMA). DMA is the most powerful feature of the bus for the data acquisition purposes since it allows a device to transfer data from/into computer memory without microprocessor intervention, thus, making it very similar to the PCI bus.

IEEE 1394 also defines a digital interface—there is no need to convert digital data into analog and tolerate a loss of data integrity. 1394 is easy to use in that there is no need for terminators, device IDs, or elaborate setup. Another benefit of 1394 is that it is "hot pluggable", meaning users can add or remove 1394 devices with the bus active. IEEE 1394 has a scaleable architecture, allowing users to mix 100, 200, 400, and 800 Mbps devices on a bus. IEEE 1394 also provides a flexible topology in that it supports daisy chaining and branching for true peer-to-peer communication between 1394 devices. In addition to asynchronous data transfer, 1394 provides isochronous data transfer, which guarantees delivery of time critical data, reducing costly buffer requirements.

Serial Bus Management provides overall configuration control of the serial bus in the form of optimizing arbitration timing, guarantee of adequate electrical power for all devices on the bus, assignment of which IEEE 1394 device is the cycle master, assignment of isochronous DMA controller ID, and notification of errors. Bus management is built upon IEEE 1212 standard register architecture. It should be noted that 1394 error notification is limited to general error detection. When an error has occurred, it may not be known when or where the error occurred, and so the delivery status of transmitted data may also be unknown.

There are two types of IEEE 1394 data transfer: asynchronous and isochronous. Asynchronous transport is the traditional computer memory-mapped, load and store interface. Data requests are sent to a specific address and an acknowledgment is returned. In addition to an architecture that scales with silicon technology, IEEE 1394 features a unique isochronous data DMA controller interface. Isochronous data DMA controllers provide guaranteed data transport at a pre-determined rate. This is especially important for time-critical multimedia data where just-in-time delivery eliminates the need for costly buffering.

Much like LANs and WANs, IEEE 1394 is defined by the high level application interfaces that use it, not a single physical implementation. Therefore as new silicon technologies allow high higher speeds, longer distances, and alternate media, IEEE 1394 will scale to enable new applications.

Perhaps most important for use as the digital interface for executer electronics is that IEEE 1394 is a peer-to-peer interface. This allows not only dubbing from one camcorder to another without a computer, but allows multiple computers to share a given camcorder without any special support in the camcorders or computers.

The IEEE 1394 bus was primarily intended for computer multimedia peripherals such as audio and video devices. One potential application for the IEEE 1394 bus is remote data acquisition and test and measurement. For example, the IEEE 1394 bus could be used to connect a remote data acquisition device or measurement device to a host computer. However, improved methods are desired for transferring data from a host computer system to a device, such as over an IEEE 1394 bus.

SUMMARY OF THE INVENTION

The present invention comprises various embodiments of a system and method for transferring data over a communications medium using double buffered data transfers. A host computer system may be coupled through a communication medium to a device, such as a data acquisition device or instrument, which may be further coupled to a unit under test (UUT). The device may comprise a first read buffer and a second read buffer for storing output data received from the host computer. The host computer may be operable to provide output data to the device, such as for analog output to the UUT, in a double buffered fashion for improved performance. The device may also use multiple DMA controllers and/or multiple DMA channels and pre-fetch mechanisms for improved performance.

In one embodiment, the method may comprise the device reading first data from the host computer and storing the first data in the first read buffer. The first data may then be transferred out from the first read buffer, e.g., after the data has been stored in the first read buffer. The device may then read second data from the host computer and store the second data in the second read buffer concurrently with the transfer of the first data out from the first read buffer. The second data may then be transferred out from the second read buffer after completion of the transfer of the first data out from the first read buffer. Further, the device may then read third data from the host computer and store the third data in the first read buffer concurrently with the transfer of the second data out from the second read buffer. The above operations may then continue in a double buffered fashion as set out above, wherein the data acquisition device reads data into one of the first read buffer and the second read buffer concurrently with transferring data out from the other one of the second read buffer and the first read buffer, respectively.

In one embodiment, the data acquisition device includes a first direct memory access (DMA) channel and a second DMA channel. In this embodiment, the first DMA channel reads data into one of the first read buffer and the second read buffer concurrently with the second DMA channel transferring data out from the other one of the second read buffer and the first read buffer, respectively. Also, the first DMA channel may be operable to read requested data as well as pre-fetch data to provide for a more continuous and uninterrupted flow of data in the system.

In one embodiment, after the first DMA channel reads data into one of the first read buffer and the second read buffer concurrently with the second DMA channel transferring data out from the other one of the second read buffer and the first read buffer, the method may synchronize the first DMA channel with the second DMA channel. For example, each DMA channel may enter a synchronization point, issue a continue command to the other DMA channel, issue a pause command to itself, then issue another continue command to the other DMA channel. In this manner, both DMA channels may then proceed with the data transfer in a synchronous manner. Other synchronizing approaches using the pause and continue command are also contemplated.

BRIEF DESCRIPTION OF THE DRAWINGS

Other advantages and details of the invention will become apparent upon reading the following detailed description and upon reference to the accompanying drawings in which.

Figure 1:
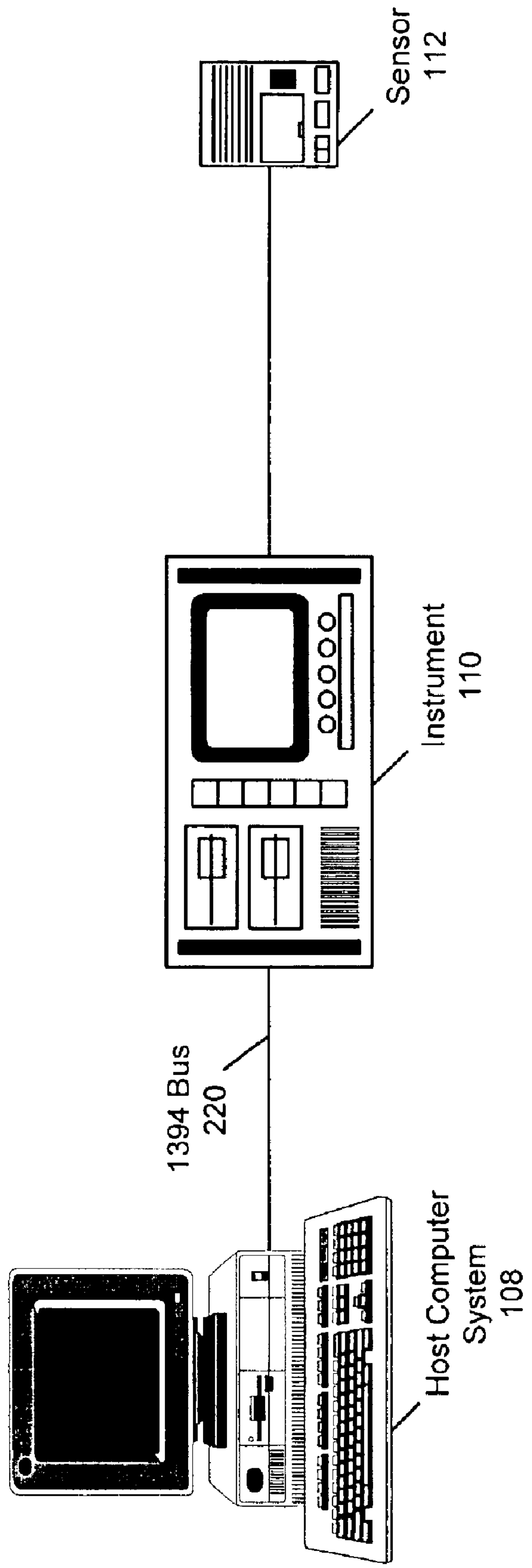
FIG. 1 illustrates a data acquisition system according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,875,313 titled "PCI Bus to IEEE 1394 Bus Translator Employing Write Pipe-Lining and Sequential Write Combining", whose inventors are Glen O. Sescila III, Brian K. Odom, and Kevin L. Schultz, and which issued on Feb. 23, 1999, is hereby incorporated by reference in its entirety as though fully and completely set forth herein.

U.S. patent application Ser. No. 09/659,914 titled "System and Method for Transferring Data Over A Communication Medium Using Double-Buffered Data Transfer Links", whose inventors are David W. Madden and Aljosa Vrancic, and which was filed on Sep. 11, 2000, is hereby incorporated by reference in its entirety as though fully and completely set forth herein.

FIG. 1—A Data Acquisition System

FIG. 1 illustrates a system according to one embodiment. It is noted that the present invention may be used in various types of systems wherein a host computer communicates with an external device. Exemplary systems include test and measurement systems, industrial automation systems, process control systems, robotics systems, machine vision and image acquisition systems, and other types of systems. In the embodiment described below, the device is an instrument or data acquisition (DAQ) device, and the system is a computer-based measurement or DAQ system.

As FIG. 1 shows, a host computer system 108 may be coupled through a communication medium 220 to a data acquisition device or instrument 110, which may be further coupled to a sensor (or actuator) 112. In a preferred embodiment, the communication medium 220 may be a serial bus, such as an IEEE 1394 bus, described in the current or future IEEE 1394 protocol specifications, although in other embodiments the bus may implement other protocols such as Ethernet, USB, or any other communication protocol.

The sensor 112 may be any type of transducer which is operable to detect environmental conditions and send sensor data to the instrument 110. The sensor 112 may also be operable to receive data from the instrument 110. The instrument 110 may be a data acquisition (DAQ) device, which combined with the sensor 112, may be operable to collect data concerning any of various phenomena, such as pressure, temperature, chemical content, current, resistance, voltage, or any other detectable attribute. The instrument or DAQ device 110 may also include data generation capabilities. The host computer system 108 may be operable to control the instrument 110 by sending requests to read from or write to the instrument's memory registers. The host computer system 108 may be further operable to obtain data from the instrument 110 for storage and analysis on the host computer system 108, either by issuing read requests or by programming the instrument 110 to send data to the memory of the host computer 108. Additionally, the host computer system 108 may be operable to send data, such as waveform data, to the device 110 for various purposes, such as for use in stimulating a unit under test (UUT), either by issuing write requests or by programming the instrument 110 to read data from the memory of the host computer 108. The host computer 108 preferably includes a memory medium which may include a software architecture similar to that shown in FIG. 4.

Figure 2A:
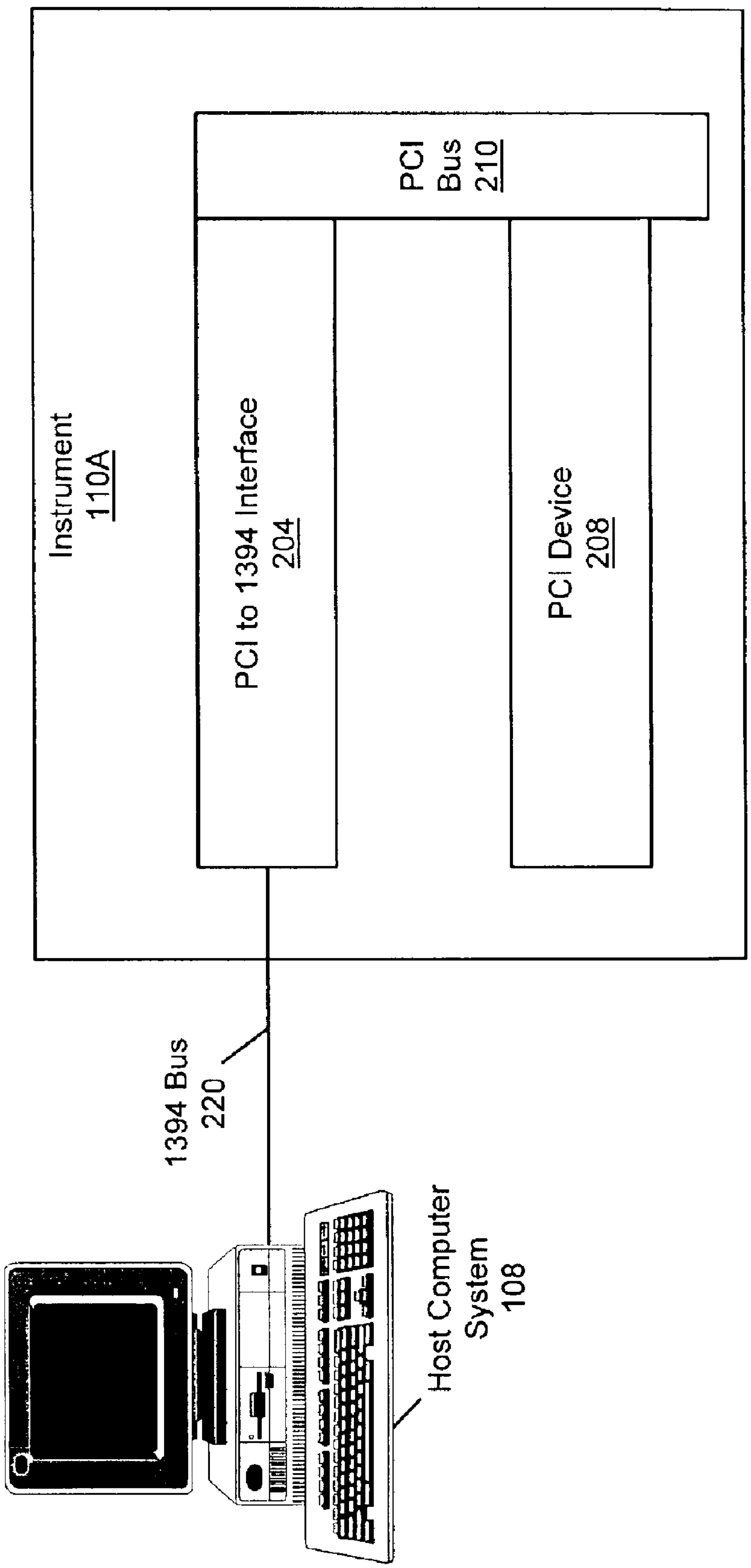
FIG. 2A illustrates a 1394/PCI data acquisition system according to one embodiment.

FIG. 2A: A 1394/PCI Data Acquisition System

FIG. 2A illustrates one embodiment of a 1394/PCI data acquisition system. As shown in FIG. 2A, host computer system 108 may be coupled to a PCI instrument 110A through serial bus 220, such as an IEEE 1394 bus.

In one embodiment, as shown in FIG. 2A, the instrument 110A may include a PCI device 208 which may be coupled to a PCI/1394 translator 204 (also referred to as a PCI/1394 Interface) through a PCI bus 210. In one embodiment, the translator 204 may include a National Instruments FirePHLI™, which provides translation between the IEEE 1394 protocol and PCI. The host computer system 108 may be operable to communicate with the PCI device 208 through the 1394 bus 220 via the 1394/PCI translator 204. The 1394/PCI translator 204 may be operable to translate between the 1394 and PCI address spaces, allowing the host computer system 108 to send 1394 requests to and receive 1394 responses from the PCI device 208. The 1394/PCI translator thus allows existing PCI devices to be used in an IEEE 1394 system. For more information on the 1394/PCI translator 204, please see U.S. Pat. No. 5,875,313 titled "PCI Bus to IEEE 1394 Bus Translator Employing Write Pipe-Lining and Sequential Write Combining", which was incorporated by reference above.

Figure 2B:
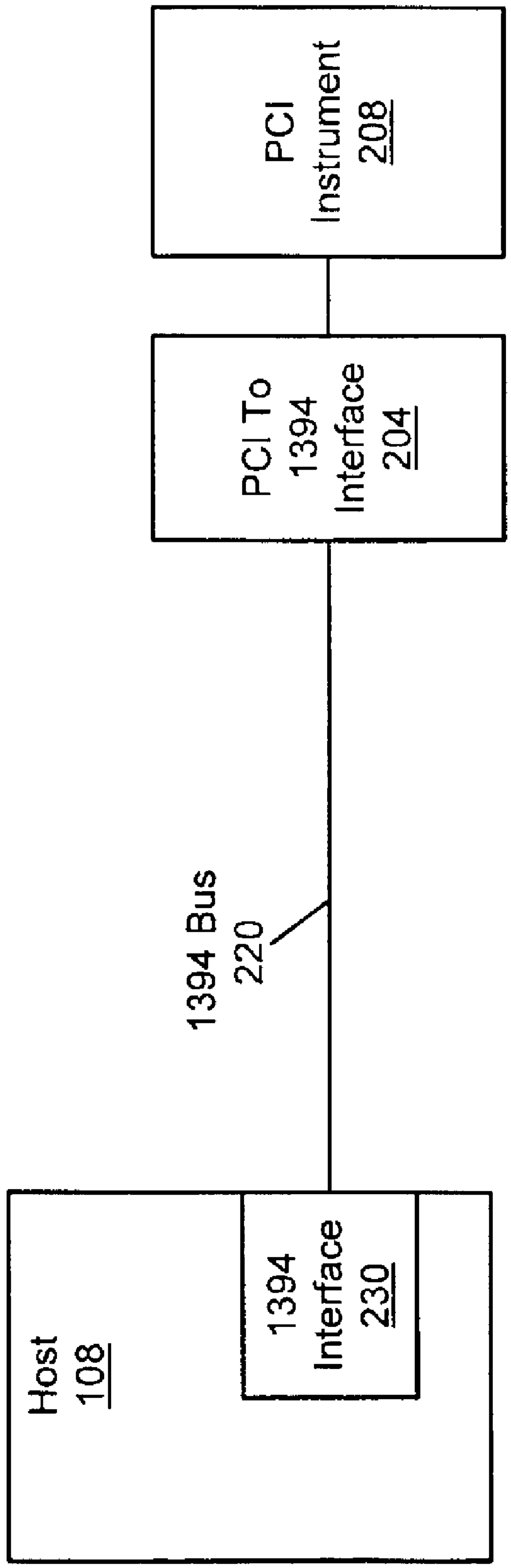
FIG. 2B is a block diagram of a 1394/PCI data acquisition system according to one embodiment.

FIG. 2B: A 1394/PCI Data Acquisition System

FIG. 2B is a block diagram of the data acquisition system of FIG. 2A, according to one embodiment. As FIG. 2B shows, host 108 may be communicatively coupled to PCI instrument 208 through 1394 bus 220 and 1394/PCI translator 204, described above with reference to FIG. 2A. Host 108 may be connected to the 1394 bus 220 via a 1394 interface 230.

Figure 3:
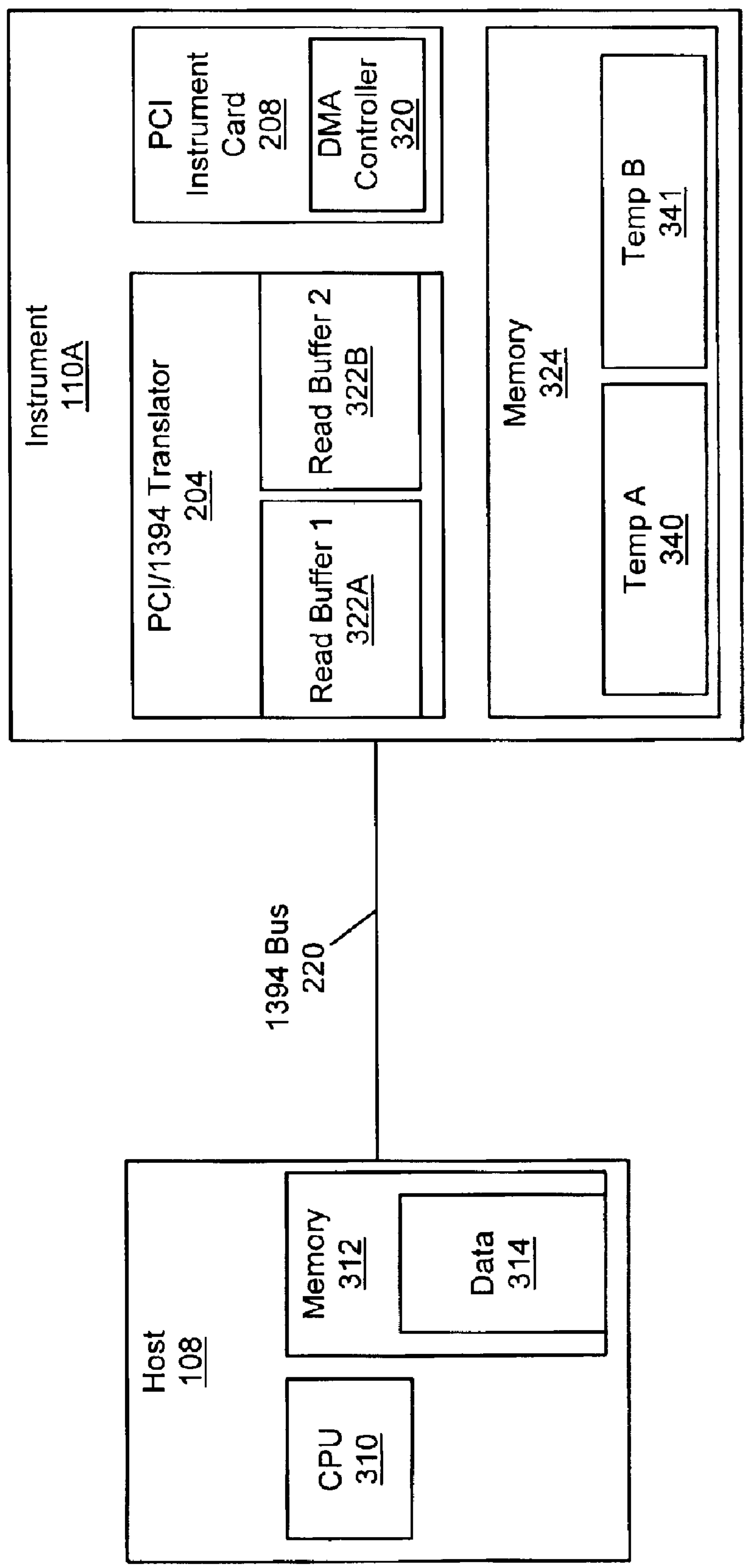
FIG. 3 is a block diagram of a 1394/PCI data acquisition system according to one embodiment.

FIG. 3: A 1394 Data Acquisition System

FIG. 3 is a block diagram of a 1394 data acquisition system, according to one embodiment. As shown in FIG. 3, host computer 108 may be communicatively coupled to a 1394-compliant instrument 110A through 1394 bus 220. The host 108 may include a CPU 310, and a memory 312 which may be operable to store programs and data 314. In one embodiment, the instrument 110A may be configured with a PCI instrument card 208 which may be operable to accept and manage sensor data. The instrument 110A may include a Direct Memory Access (DMA) Controller 320 which, in one embodiment, comprises two DMA channels. In another embodiment, the instrument 110A may include two DMA controllers, wherein each DMA controller supports one DMA channel. The instrument 110A may also include a 1394/PCI bridge or translator 204, such as a National Instruments FirePHLI™, which may provide translation between the IEEE 1394 protocol and PCI, as mentioned above. Finally, as can be seen in FIG. 3, the instrument 110A may also include read buffers 322A and 322B which may be coupled to the DMA Controller(s) 320 and the 1394/PCI translator 204, and which may be operable to store data transferred from the host 108, as well as memory 324, which may be coupled to the DMA Controller(s) 320, and which may be operable to store data transferred from the host computer, or data slated for transfer to the host computer, such as data acquired from a sensor. Memory 324 may comprise temporary storage locations Temp A 340 and Temp B 341. The use of temporary storage locations Temp A 340 and Temp B 341 is described below with reference of FIG. 8.

Thus, although in the embodiments described below the system includes a single DMA controller operating two DMA channels, in other embodiments of the invention, there may be multiple DMA controllers, e.g., one DMA controller per DMA channel. In either approach, the techniques described herein are applicable. In other words, in the approaches described herein, the terms "DMA controller" and "DMA channel" may be used interchangeably.

Figure 4:
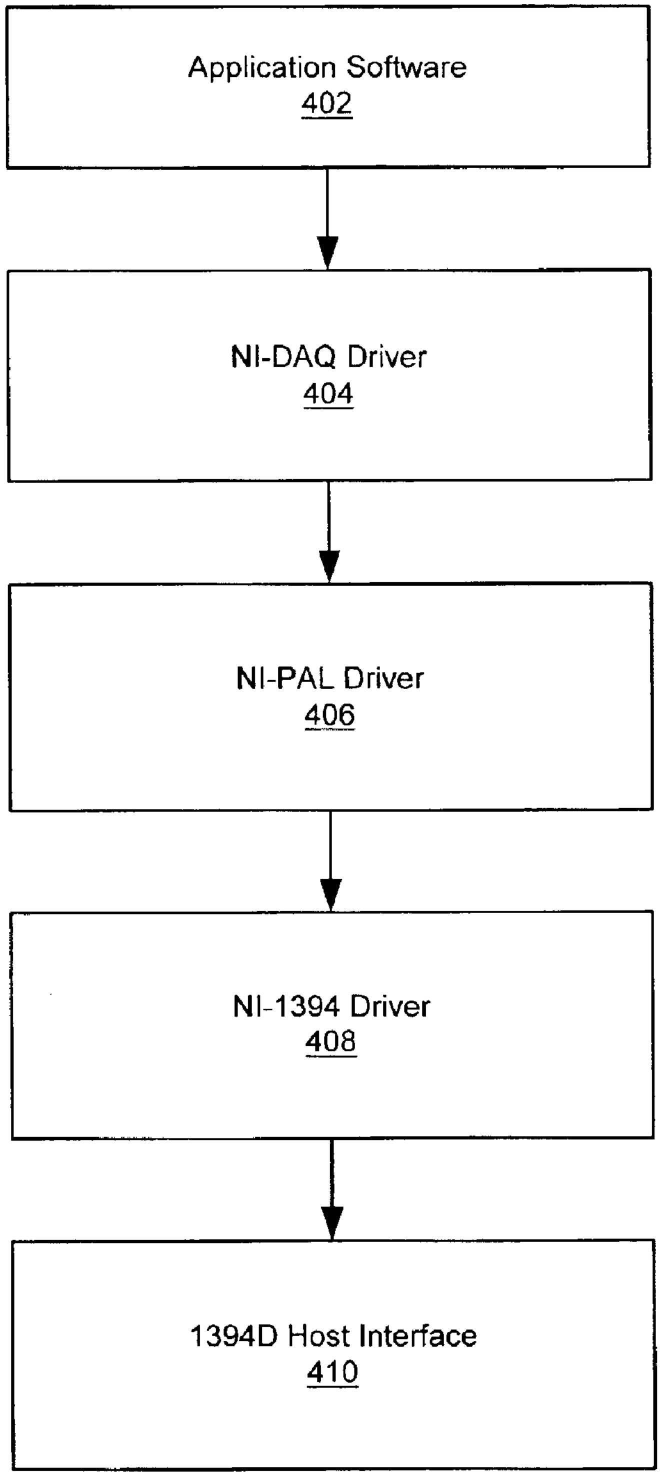
FIG. 4 is a block diagram of a software architecture of the system according to one embodiment.

FIG. 4: Software Architecture

FIG. 4 is a block diagram of the software architecture of the system, according to one embodiment. As FIG. 4 shows, the top layer of the software architecture is application software 402. The application software 402 may be any software program which is operable to provide an interface for control and/or display of a data acquisition (DAQ) process. In one embodiment, the software application 402 may include a program developed in National Instrument's LabVIEW™ or LabWindows/CVI development environments. A driver program 404 may be below the application software 402. The driver 404 may be a DAQ driver 404, such as National Instrument's NI-DAQ driver program. The next software layer may optionally be a platform abstraction layer (PAL) driver 406, such as National Instrument's NI-PAL driver program. The PAL 406 may operate to abstract the internal communication bus and operating system to a common API. A 1394 platform abstraction layer firewire (PAL-FW) 1394 driver 408, such as National Instrument's NI-PAL F/W driver program may be below the NI-PAL driver 406. This software may manage the data transmission process according to one embodiment of the present invention, described below with reference to FIG. 5. A 1394D host interface 410 is below the NI-PAL F/W driver 408, such as provided by Microsoft Corporation, which abstracts the driver layer. The 1394D host interface 410 provides an interface to 1394 chipset driver software, such as OHCI 1394 driver software, which interfaces with the relevant hardware.

Figure 5:
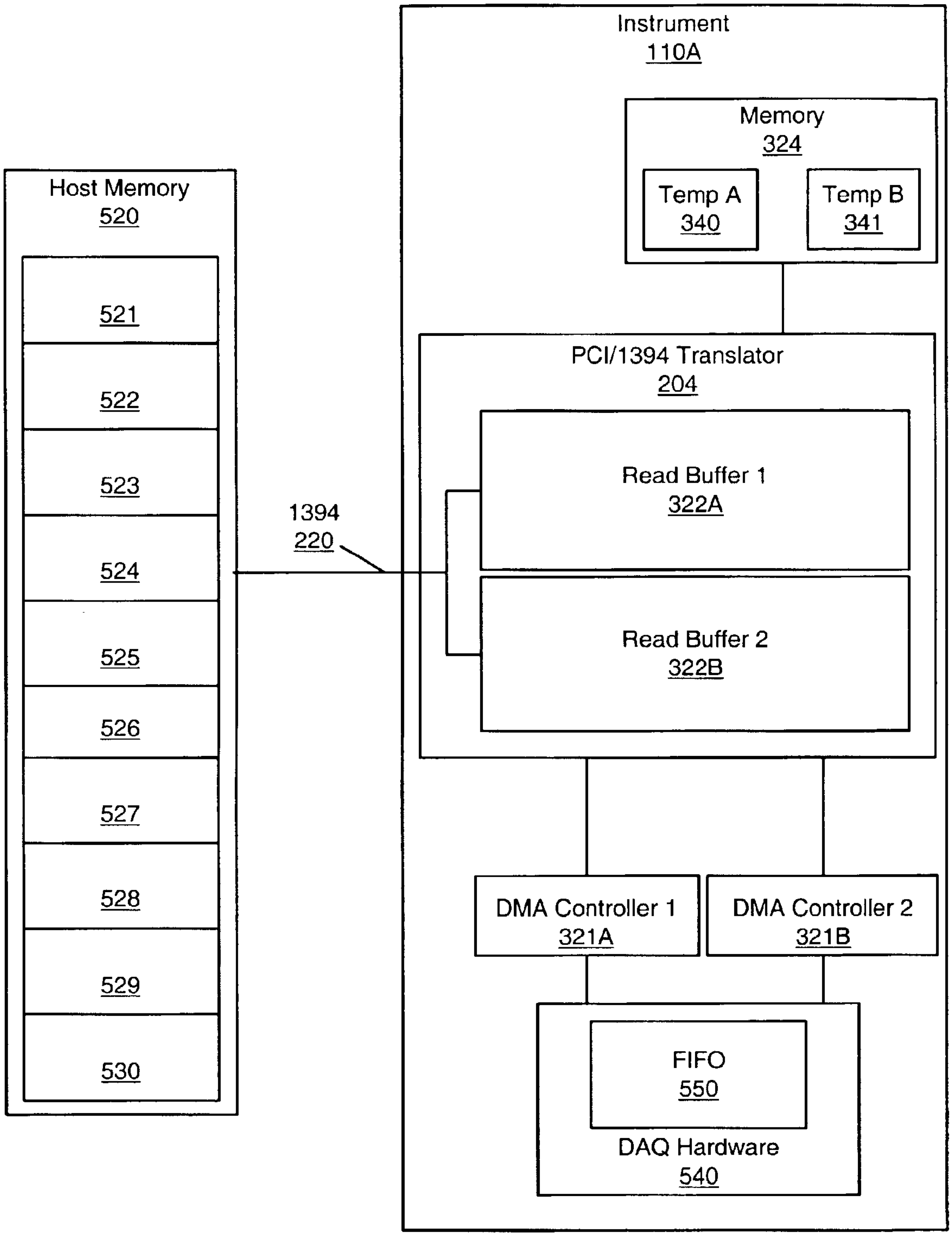
FIG. 5 is a block diagram of a double buffered data transfer system according to one embodiment.

FIG. 5: A Double Buffered Data Acquisition System

FIG. 5 is a block diagram of a double buffered data acquisition system according to one embodiment. As FIG. 5 shows, a host memory 520 may be coupled through 1394 bus 220 to instrument 110A. Instrument 110A may comprise a PCI/1394 Translator 204, a Memory 324, a first DMA channel or controller 321A, a second DMA channel or controller 321B, and Data Acquisition (DAQ) Hardware 540. PCI/1394 Translator 204 may be coupled to the Memory 324 and the DMA channels 321A and 321B, and may comprise read buffer 1 322A and read buffer 2 322B. As noted above, memory 324 may comprise temporary storage locations Temp A 340 and Temp B 341. The use of temporary storage locations Temp A 340 and Temp B 341 is described below with reference of FIG. 8. DAQ hardware 540 may be coupled to the DMA channels 321A and 321B, and may comprise a First In-First Out (FIFO) buffer 550.

In one embodiment, host memory 520 may comprise an ordered series of memory blocks 521–530 (whose number and labels are for illustration purposes only). In one embodiment the host memory 520 may comprise a virtual memory buffer in the form of a linked list of nodes describing successive blocks of contiguous physical memory residing on the host computer. During a data output operation to the device 110, e.g., an "analog out" operation, the Translator 204 may be operable to pre-fetch additional data from the successive blocks of host memory 520 in response to data reads requested by DMA channel 1 321A, and to store both the requested data and the pre-fetched data in one of the read buffers 322. In one embodiment, the DMA channels 321A and 321B may be operable to perform tasks in parallel. For example, DMA channel 1 321A may request a read from host memory 520, which may trigger a pre-fetch of data from the host computer to read buffer 1 322A, while DMA channel 2 321B consumes previously pre-fetched data from the Translator's read buffer 2 322B. In other words, while DMA channel 2 321B is consuming the pre-fetched data from the Translator's read buffer 1 322A, the Translator may be pre-fetching a next block of data from the host memory 520 and storing the next block of data into the Translator's read buffer 2 322B, i.e., transfers data from the read buffer 2 322B out to the FIFO 550. In one embodiment, DMA channel 1 321A may be operable to program DMA channel 2 321B to consume the pre-fetched data from the Translator's read buffer 322, providing transfer information to DMA channel 2 321B indicating memory locations from which data is to be read (consumed). In one embodiment, DMA channel 2 321B consuming pre-fetched data from the Translator's read buffer 322 comprises DMA channel 2 321B making successive data reads from the Translator's read buffer 322 and storing the data in the DAQ hardware's FIFO 550.

In one embodiment data transfer instructions may be provided to the device by the host computer system 108 in the form of a linked-list of transfer nodes which may be transferred to a remote heap on the device in a double buffered manner as described in U.S. patent application Ser. No. 09/659,914 titled "System and Method for Transferring Data Over A Communication Medium Using Double-Buffered Data Transfer Links", which was incorporated by reference above. Further descriptions of this parallel double buffered data transfer are presented as flow charts in FIGS. 7 and 8, described below.

Figure 6:
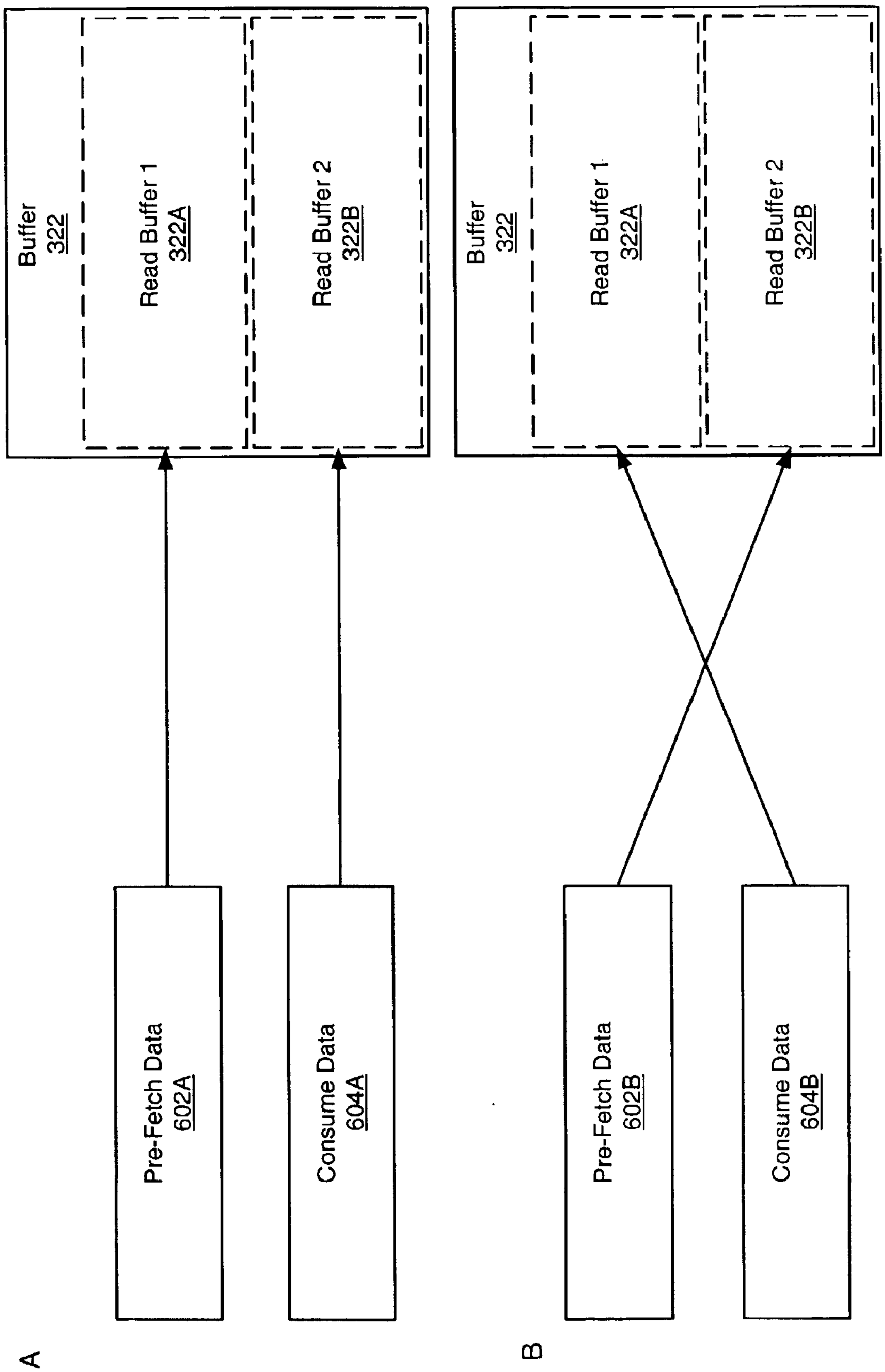
FIG. 6 is a diagram of a double buffered process, according to one embodiment.

FIG. 6: Double Buffering

FIG. 6 illustrates the process of double buffering data in a parallel manner. As FIG. 6 A shows, a first process (DMA channel 1 321A) may read data 602A from host memory 520 into read buffer 1 322A while a second process (DMA channel 2 321) consumes data 604A from read buffer 2 322B. When all desired data from read buffer 2 561 have been consumed, the buffers may be switched, and the first process (DMA channel 1 321A) may then read data 602B from host memory 520 into read buffer 2 322B while the second process (DMA channel 2 321) consumes data 604B from read buffer 1 322A. This double buffering data transfer may continue until there are no more data to transfer.

Figure 7:
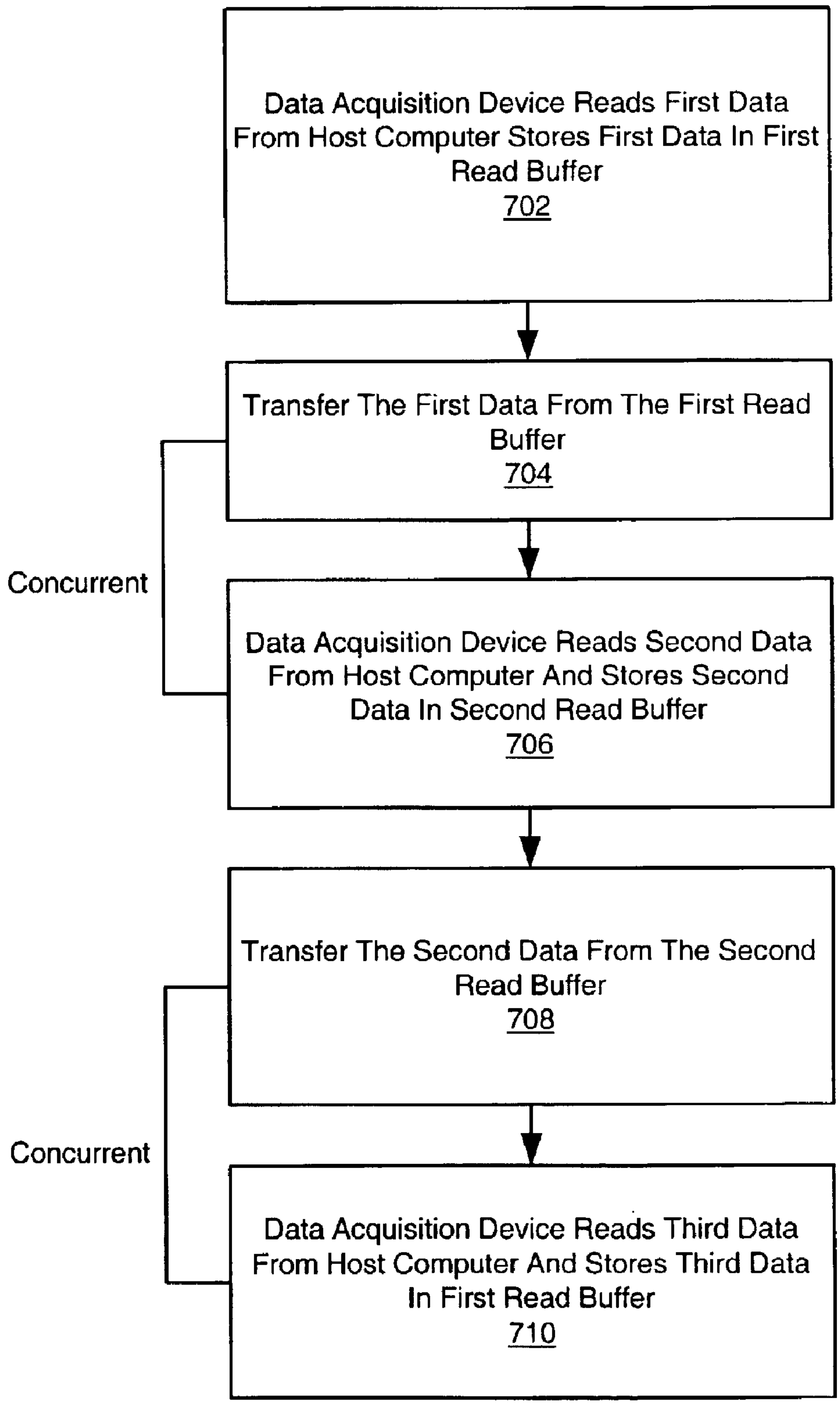
FIGS. 7 and 8 are flowcharts of two embodiments of a data transfer process.

FIG. 7: A Double Buffered Data Transfer Process

FIG. 7 is a flowchart of a double buffered data transfer process in which a host computer system is coupled through a communication medium to a data acquisition device which includes a first read buffer and a second read buffer. FIG. 7 illustrates a data output operation to the device 110, e.g., an "analog out" operation.

As FIG. 7 shows, in 702 the data acquisition device may read first data from the host computer and store the first data in the first read buffer. In 704 the first data may be transferred out from the first read buffer, such as to the FIFO 550. In one embodiment the data may be analog waveform data, which is transferred out to a device under test to provide a stimulation signal to the device as part of a test procedure. As indicated in FIG. 7, while the first data are being transferred out from the first read buffer 322A, in 706 the data acquisition device may read second data from the host computer and store the second data in the second read buffer, i.e., the reading of the second data is preferably performed concurrently with the transfer of the first data out from the first read buffer. Performing the reads and writes to and from the two read buffers concurrently may improve the performance of the system substantially.

Then in 708, the second data may be transferred from the second read buffer concurrently with the data acquisition device reading third data from the host computer and storing the third data in the first read buffer, as indicated in 710. It should be noted that the transfer of the second data out from the second read buffer preferably occurs after completion of the transfer of the first data out from the first read buffer. In other words, the process may only maintain one output stream of data to the FIFO 550, and so data may be read only from one read buffer at a time.

Thus, as long as there are data to be read from the host computer system, the process may read to and write from the two read buffers in a concurrent manner to effect a double buffered data transfer scheme. Such a scheme may as much as double the performance of the system.

Figure 8:
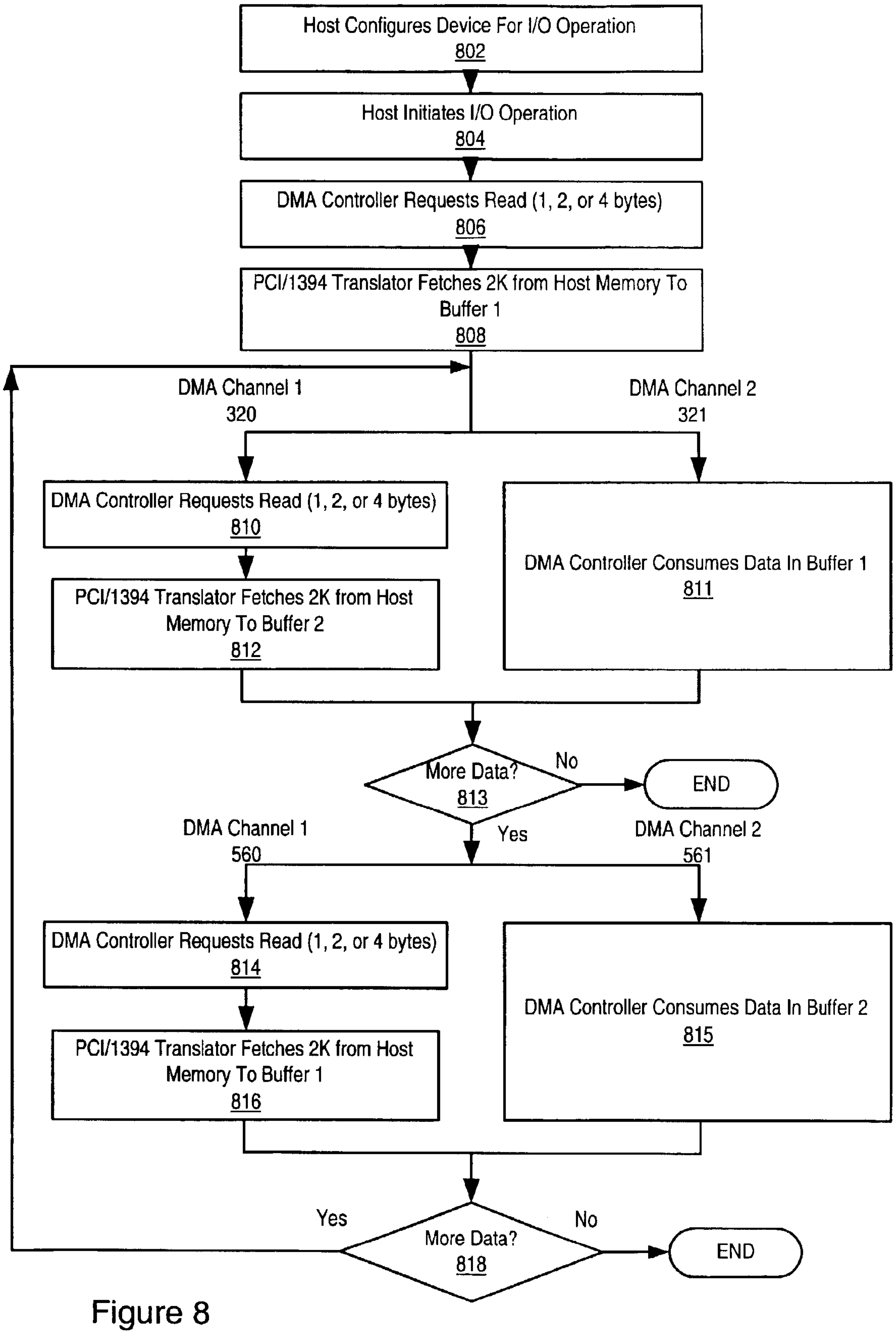

FIG. 8: A Double Buffered Data Transfer Process

FIG. 8 is a detailed flow chart of the double-buffered data acquisition process performed by the system according to one embodiment. In 802 the host computer 108 may configure the device (instrument) 110A for an I/O operation, such as a read operation wherein data is transferred from host memory 520 to DAQ hardware 540 on the device 110A. In 804 the host 108 may initiate the I/O operation. In an alternate embodiment, the device may initiate the I/O operation. Then in 806 DMA channel 1 321A (i.e., the data acquisition device 110A) may request a read from host memory 520. In various embodiments, the read may be for 1, 2, or 4 bytes or more, depending upon the data transfer rates of the transmission protocol. For purposes of illustration, the requested read is for 4 bytes. The read for 4 bytes requested by the DMA channel 1 321A may trigger the PCI/1394 Translator 204 to transfer a greater amount of data from the host computer using a pre-fetch method, such as 2K (2048 bytes) of data, to read buffer 1 322A, as indicated in 808. In other embodiments, the PCI/1394 Translator 204 may read 1K (bytes) or 512 bytes from the host memory 520, depending upon the packet size of the transmission protocol. In one embodiment, after the 2K of data is transferred to read buffer 1 322A, the initial 4 bytes requested by DMA channel 1 321A may be transferred from the read buffer 1 and stored into temporary memory location Temp A 340 in order to satisfy the read request of DMA channel 1 321A. Thus the 2K of data transferred to the read buffer 1 322A may comprise requested data (4 bytes) and pre-fetched data (2K–4 bytes). In one embodiment, after the 4 bytes of data are transferred to Temp A 340, the DMA channel 1 321A may program DMA channel 2 321B to consume the pre-fetched data in read buffer 1 322A, i.e., to transfer the data out from the read buffer 1 322A.

In one embodiment, after the Translator 204 pre-fetches the data, the two DMA channels 321A and 321B may synchronize before proceeding with the data transfer process. This event in the process is referred to as a sync point. In one embodiment, the DMA channel synchronization may operate according to the following rules: DMA channel 1 321A may not initiate the next read/pre-fetch into read buffer 1 322A (or 2 321) until DMA channel 2 321B has finished consuming the pre-fetched data from read buffer 1 322A (or 2 322B); and DMA channel 2 321B may not begin consuming the pre-fetched data from read buffer 1 322A (or 2 322B) until the DMA channel 1 321A initiated transfer of data into read buffer 1 322A (or 2 322B) has been completed. In this way, conflicts between data transfer operations on a particular read buffer may be avoided. The synchronization process is described in more detail below with reference to FIGS. 9A–9E.

After the Translator 204 pre-fetches the data, DMA channel 2 321B may begin consuming the data in read buffer 1 322A, as indicated by 811. In the embodiment described above in which the requested read data is stored in the temporary memory location Temp A 340, the DMA channel 2 321B may read (consume) the requested read data from Temp A 340 before reading (consuming) the data in read buffer 1 322A. Meanwhile, DMA channel 1 321A may request another read for 4 (or 2 or 1) bytes of data from the host memory 520, as shown in 810. As described above, the read requested by DMA channel 1 321A may trigger the translator to pre-fetch 2K of data from the host memory 520 to read buffer 2 322B, as indicated by 812 (and transfer the requested read data to Temp B 322B, in one embodiment). Thus, new data may be pre-fetched into read buffer 2 322B while previously fetched data is consumed (read) from read buffer 1 322A.

In one embodiment, after 811 and 812, the two DMA channels 321A and 321B may synchronize again, as described above, and as described in detail below with reference to FIGS. 9A–9E. In 813 a determination may be made whether there are more data to be transferred in the I/O operation. If no more data are to be transferred, the process may end. If there are more data to be transferred, then the read buffers may be switched and DMA channel 2 321B may begin consuming the pre-fetched data in read buffer 2 322B, as indicated by 815. Again, in one embodiment, the requested read data may be read from Temp B 322B first. Meanwhile, DMA channel 1 321A may request another read for 4 (or 2 or 1) bytes of data from the host memory 520, as shown in 814. The read requested by DMA channel 1 321A may trigger the translator to pre-fetch 2K of data from the host memory 520 to read buffer 1 322A, as indicated by 816. Thus, new data may be pre-fetched into read buffer 1 322A while previously fetched data is consumed (read) from read buffer 2 322B.

In one embodiment, after 815 and 816, the two DMA channels 321A and 321B may synchronize again, as described above. Then in 818 a determination may be made whether there are more data to be transferred in the I/O operation. If no more data are to be transferred, the process may end. Otherwise, as FIG. 8 shows in the 'yes' branch of decision 818, the process described above may be repeated until the I/O operation is completed.

FIGS. 9A–9E—DMA Channel Synchronization

FIGS. 9A–9E illustrate various embodiments of the invention as applied to the synchronization of DMA channels. As noted above, DMA channels involved in the data transfer may control their own and/or each other's execution. As also mentioned above in the description of FIG. 8, in one embodiment, the decision point 813 may also be used as a synchronization point, where the DMA channels may synchronize their operations before proceeding with subsequent tasks.

Figure 9A:
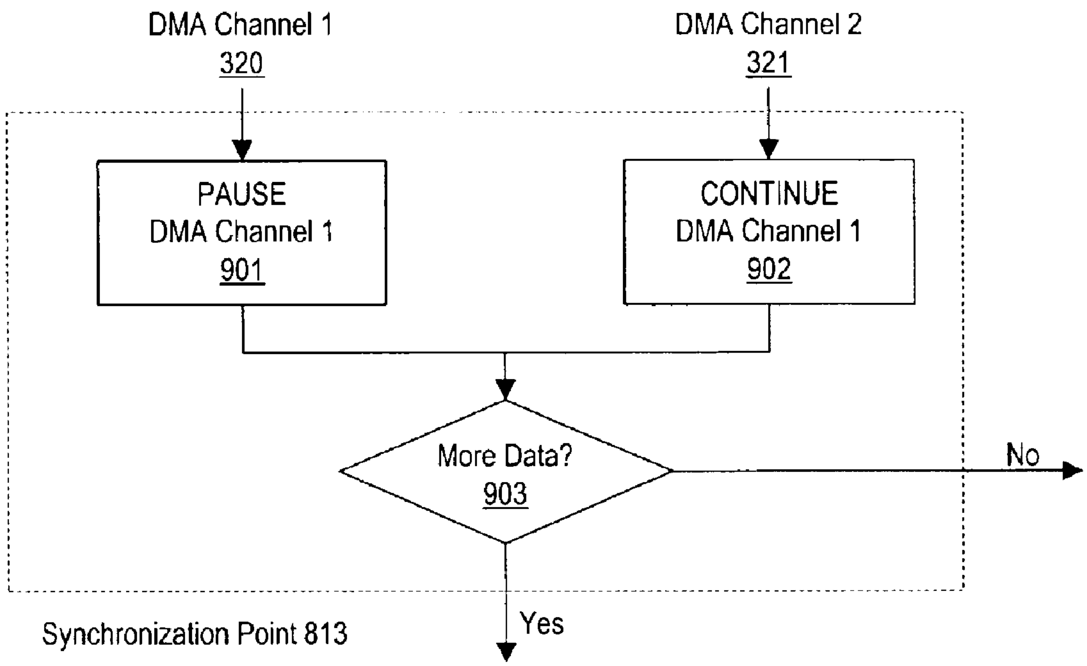
FIGS. 9A–9E illustrate various embodiments of a method to perform DMA channel synchronization.
Figure 9B:
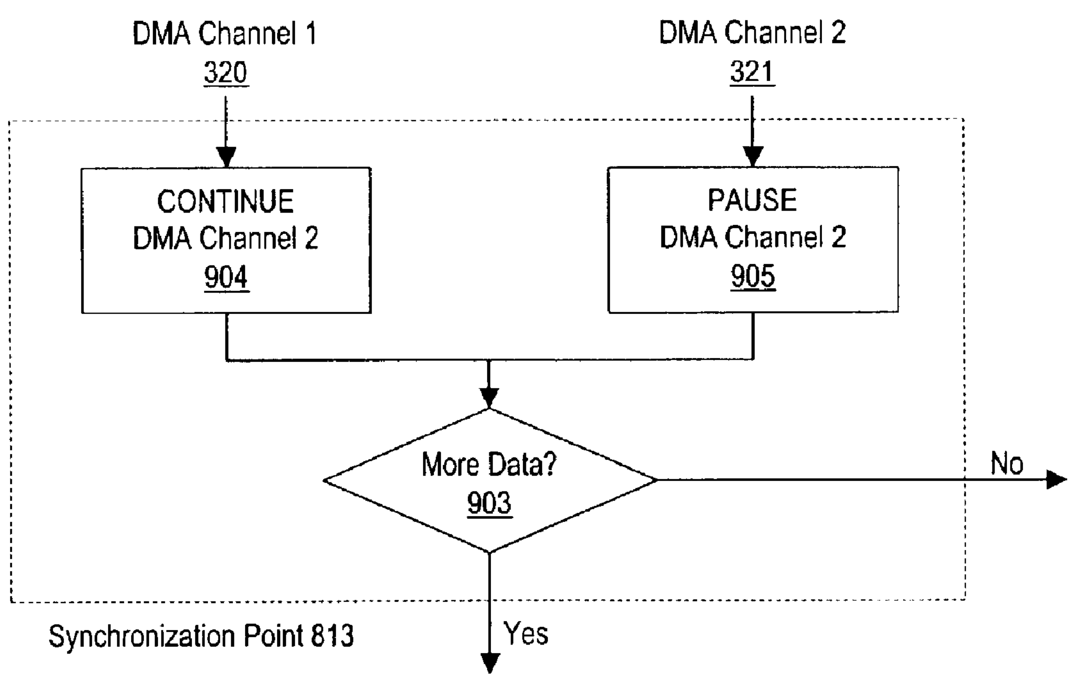

For example, in an embodiment in which a guarantee can be made that DMA channel 1 320 will always reach the synchronization point before DMA channel 2 321, the synchronization of the two DMA channels may be achieved by decomposing the synchronization point 813, as shown in FIG. 9A. As FIG. 9A shows, as soon as DMA channel 1 320 enters the synchronization point 813, it may pause itself by issuing a pause command 901. Then, when DMA channel 2 321 reaches the same synchronization point it may awaken DMA channel 1 320, e.g., by a continue command 902. Both channels may then proceed to the decision point 903. In the described embodiment, the synchronization may be achieved using only pause and continue commands that may be easily implemented in hardware. A similar approach may be used in the embodiment shown in FIG. 9B, where the synchronization point 813 is always reached first by the DMA channel 2 321.

Figure 9C:
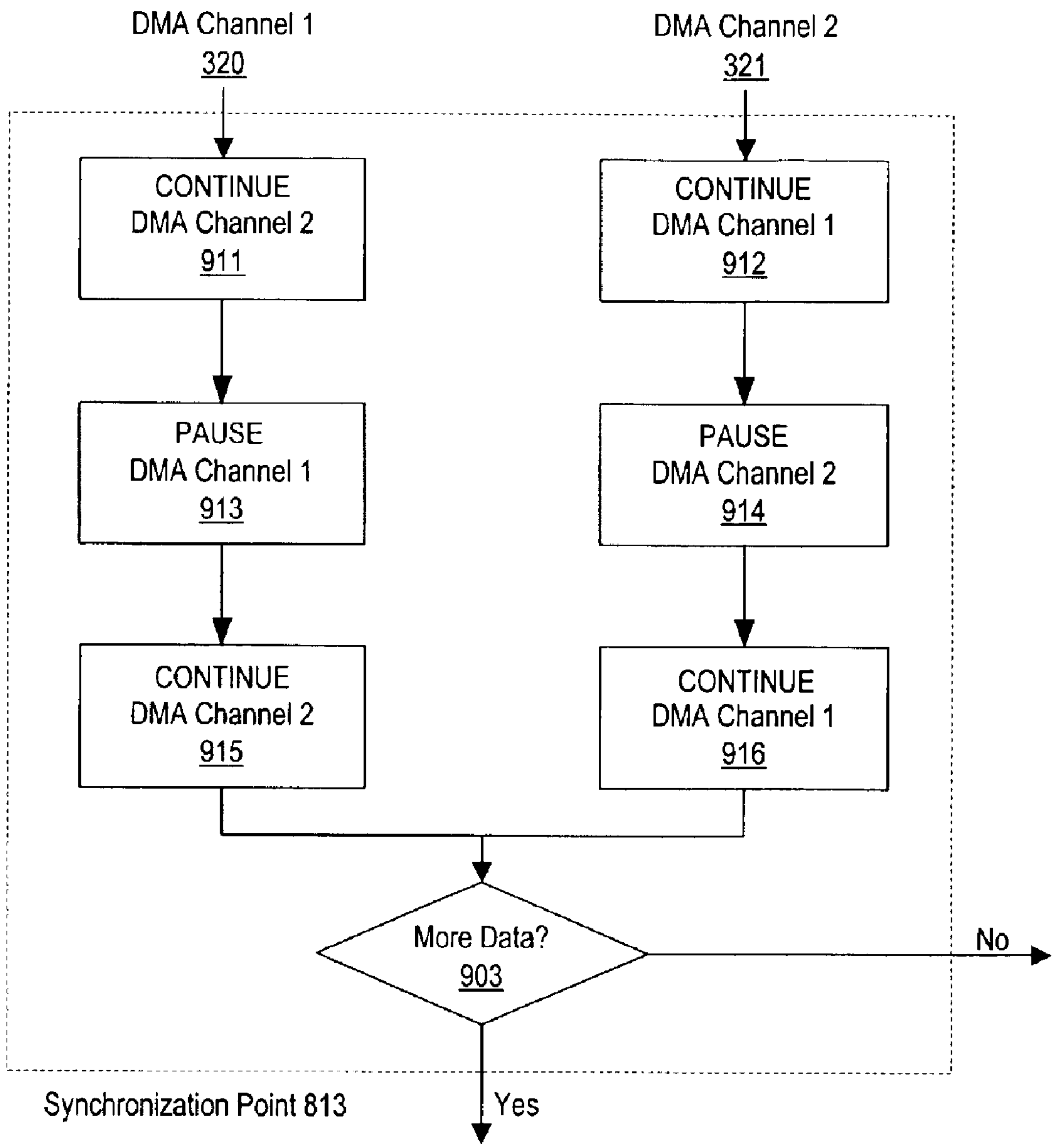

If no guarantees can be made which of the DMA channels will reach synchronization point 813 first, a more complex algorithm may be required, such as that shown in FIG. 9C. When any of the DMA channels enters the synchronization point, it may issue continue command 911 or 912 on the other channel, and then pause itself, e.g., by pause command 913 or 914. Once a DMA channel is awakened, it may re-issue the continue command 915 or 916 to the other DMA channel. For example, in the case that DMA channel 1 320 reaches the synchronization point first, it may first issue continue command 911 and then pause itself 913. Since DMA channel 2 is running, the continue command 911 will have no effect. Once DMA channel 2 reaches the synchronization point it may issue continue command 912 and then pause itself 914. The continue command 912 may awaken DMA channel 1, which in turn may execute continue command 915 and proceed to run. The continue command 915 may awaken the DMA channel 1, which may then proceed to run. The final result is that both DMA channels may continue running after they rendezvous at the synchronization point. Again, the entire process has been achieved by only using continue and pause commands.

Figure 9D:
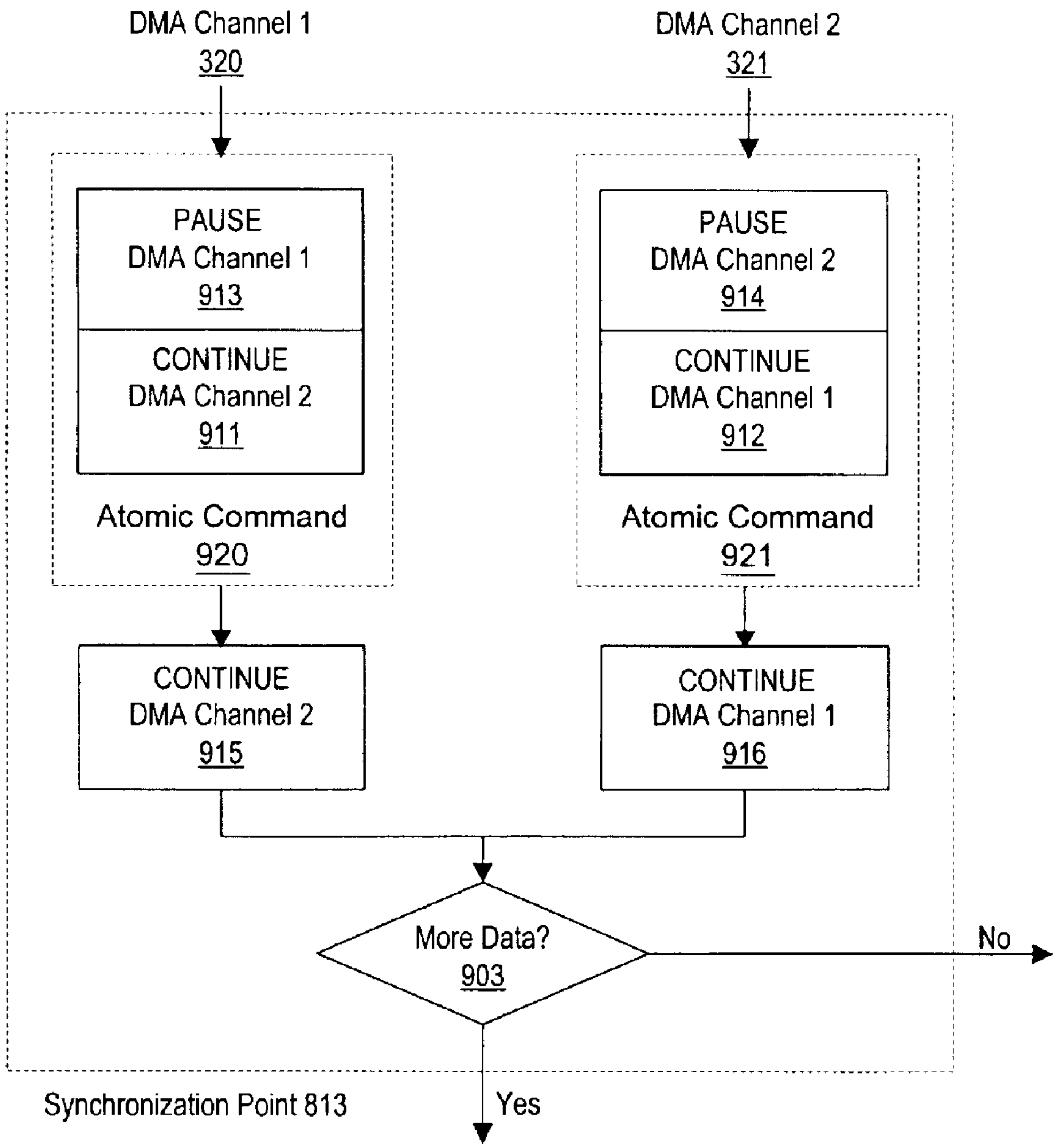

In one particular embodiment, the execution may proceed as follows: DMA channel 1 may reach the continue command 911 first. Since DMA channel 2 is running, the command will have no effect. Next, DMA channel 2 may execute the continue command 912. Since DMA channel 1 is running the command again will have no effect. DMA channel 2 may then pause itself by executing 914. Finally, DMA channel 1 may pause itself by executing 913. Since both DMA channels are paused, a deadlock state is reached. To prevent deadlocks, an algorithm such as that shown in FIG. 9D may be used. As FIG. 9D shows, the commands 911 and 913, and 912 and 914 may be combined into single commands 920 and 921 that may be executed atomically, i.e., even though the pause subcommands 913 and 914 are executed, a first DMA channel does not check its state and pause itself if requested until all subcommands in the atomic command are executed. It should be noted that if the second DMA channel issues a continue command on the first DMA channel before the first DMA channel completes its atomic command, then the first DMA channel's pause command will have no effect (and vice versa).

Figure 9E:
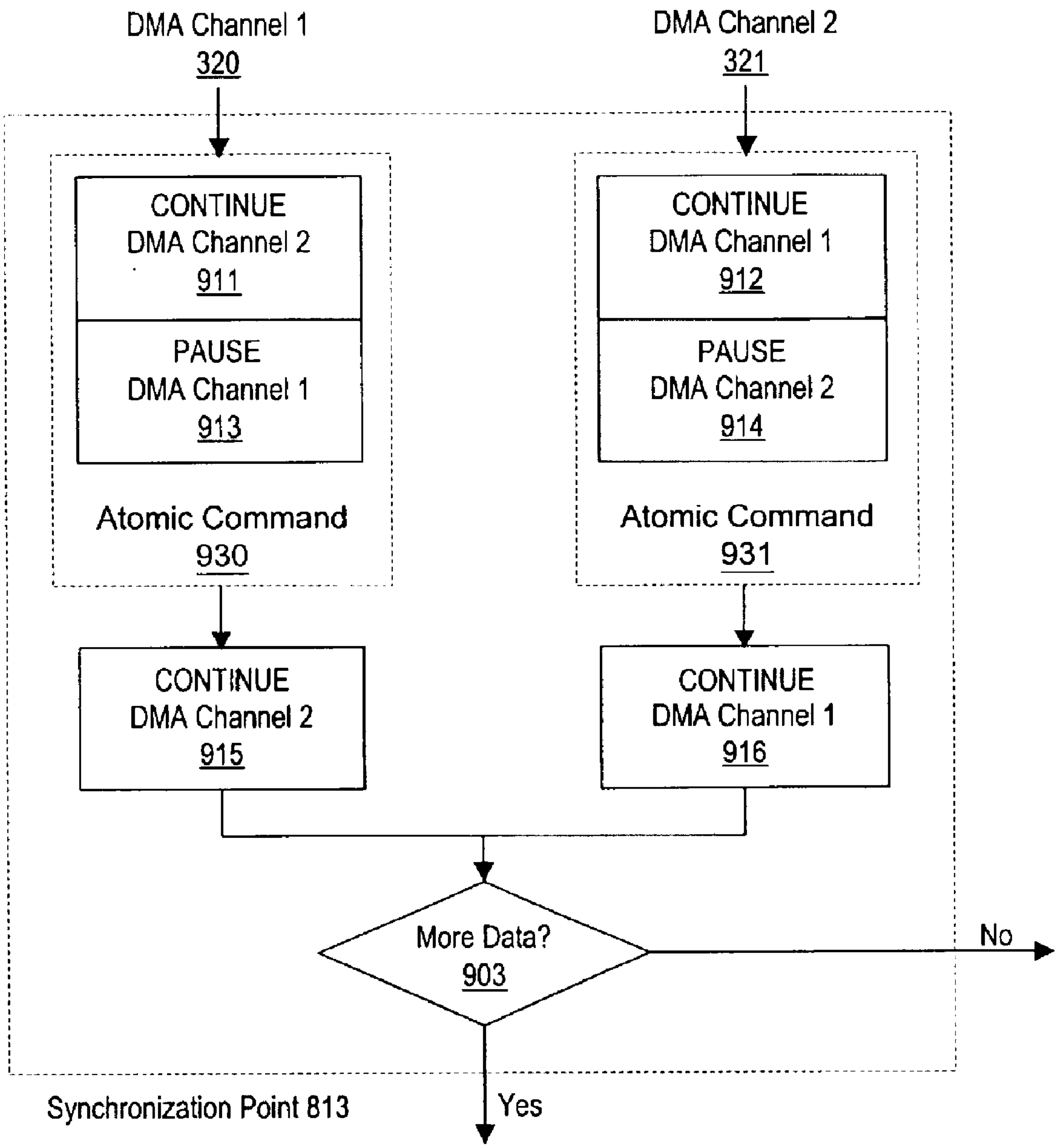

Another solution may be to combine commands 911 and 913, and 912 and 914 into single atomic execution commands 930 and 931, as shown in FIG. 9E, and to impose the restriction that while any atomic command is being executed by a DMA channel no other atomic commands from other DMA channels may be executed.

It is noted that the examples presented above can easily be extended to other synchronization points of FIG. 8, or in other embodiments of the methods presented herein.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for transferring data in a system including a host computer system coupled to a device, the method comprising:

a first direct memory access (DMA) channel of the device transferring first data from the host computer system into a first buffer of the device;

a second DMA channel of the device transferring the first data from the first buffer;

the first DMA channel of the device transferring second data from the host computer system into a second buffer of the device concurrently with said second DMA channel transferring the first data from the first buffer;

synchronizing the first DMA channel and the second DMA channel, after said first DMA channel transferring second data into the second buffer concurrently with the second DMA channel transferring the first data from the first buffer;

wherein said synchronizing comprises:

the first DMA channel entering a synchronization point;

the first DMA channel issuing a continue command to the second DMA channel, thereby awakening the second DMA channel if the second DMA channel is paused;

the first DMA channel issuing a pause command to itself, thereby pausing itself;

the second DMA channel entering the synchronization point;

the second DMA channel issuing a continue command to the first DMA channel, thereby awakening the first DMA channel;

the second DMA channel issuing a pause command to itself, thereby pausing itself; and the first DMA channel issuing a continue command to the second DMA channel, thereby awakening the second DMA channel;

wherein, after said first DMA channel issuing the continue command to the second DMA channel, the first DMA channel and the second DMA channel are operable to proceed with further transferring data in a concurrent manner.

2. The method of claim 1, further comprising:

the first DMA channel transferring third data into the first buffer; and the second DMA channel transferring the second data from the first buffer concurrently with said first DMA channel transferring third data.

3. The method of claim 1, wherein, after said second DMA channel issuing the continue command to the first DMA channel, the first DMA channel and the second DMA channel are operable to proceed with said transferring data in a synchronous manner.

4. The method of claim 1, further comprising:

after said first DMA channel entering the synchronization point, the first DMA channel issuing a first single atomic command, comprising:

issuing a pause command to the first DMA channel; and issuing a continue command to the second DMA channel, thereby awakening the second DMA channel if the second DMA channel is paused;

after said second DMA channel entering the synchronization point, the second DMA channel issuing a second single atomic command, comprising:

issuing a pause command to the second DMA channel; and issuing a continue command the first DMA channel to awaken the first DMA channel, thereby awakening the first DMA channel if the first DMA channel is paused.

5. The method of claim 4, wherein, during said first DMA channel issuing the first single atomic command, the second DMA channel is excluded from issuing other atomic commands; and wherein, during said second DMA channel issuing the second single atomic command, the first DMA channel is excluded from issuing other atomic commands.

6. The method of claim 4, wherein the first DMA channel does not pause itself if requested until the first single atomic command issued by the first DMA channel is performed; and wherein the second DMA channel does not pause itself if requested until the second single atomic command issued by the second DMA channel is performed.

7. The method of claim 6, further comprising:

the first DMA channel issuing a second continue command to the second DMA channel, thereby awakening the second DMA channel if the second DMA channel is paused;

the second DMA channel issuing a second continue command to the first DMA channel, thereby awakening the first DMA channel if the first DMA channel is paused;

wherein, after said first DMA channel issuing the second continue command to the second DMA channel, and said second DMA channel issuing the second continue command to the first DMA channel, the first DMA channel and the second DMA channel are operable to proceed with further transferring data in a concurrent manner.

8. The method of claim 1, further comprising:

the first DMA channel issuing a first single atomic command, comprising:

issuing a continue command to the second DMA channel, thereby awakening the second DMA channel if the second DMA channel is paused; and issuing a pause command to itself, thereby pausing itself;

wherein, during said first DMA channel issuing the first single atomic command, the second DMA channel is excluded from issuing other atomic commands;

the method further comprising:

the second DMA channel issuing a second single atomic command, comprising:

issuing a continue command to the first DMA channel, thereby awakening the first DMA channel if the first DMA channel is paused; and issuing a pause command to itself, thereby pausing itself;

wherein, during said second DMA channel issuing the second single atomic command, the first DMA channel is excluded from issuing other atomic commands;

the method further comprising:

the first DMA channel issuing a second continue command to the second DMA channel, thereby awakening the second DMA channel if the second DMA channel is paused;

the second DMA channel issuing a second continue command to the first DMA channel, thereby awakening the first DMA channel if the first DMA channel is paused;

wherein, after said first DMA channel issuing the second continue command to the second DMA channel, and said second DMA channel issuing the second continue command to the first DMA channel, the first DMA channel and the second DMA channel are operable to proceed with further transferring data in a concurrent manner.

9. The method of claim 1, further comprising:

the second DMA channel transferring the second data from the second buffer after completion of said transferring the first data from the first buffer; and the first DMA channel transferring third data from the host computer system into the first buffer concurrently with said second DMA channel transferring the second data from the second buffer.

10. The method of claim 1, wherein said first DMA channel transferring the first data from the host computer into the first buffer of the device comprises the first DMA channel transferring first requested data and first pre-fetch data into the first buffer, wherein the first pre-fetch data includes data additional to the first requested data and associated with the first requested data.

11. The method of claim 10, wherein said first DMA channel transferring the second data from the host computer into the second buffer of the device comprises the first DMA channel transferring second requested data and second pre-fetch data into the second buffer, wherein the second pre-fetch data includes data additional to the second requested data and associated with the second requested data.

12. The method of claim 10, further comprising:

transferring the first requested data from the first buffer to a first temporary memory after transferring the first data into the first buffer, wherein said transferring the first requested data from the first buffer to the first temporary memory location operates to satisfy a first read request.

13. The method of claim 1, further comprising:

the second DMA channel transferring the second data from the second buffer after completion of said transferring the first data from the first buffer;

wherein said second DMA channel of the device transferring the first data from the first buffer comprises transferring the first data from the first buffer to a FIFO memory; and wherein said transferring the second data from the second buffer comprises transferring the second data from the second buffer to the FIFO memory.

14. The method of claim 1, wherein said second DMA channel of the device transferring the first data from the first buffer is performed after said first DMA channel transferring the first data from the host computer into the first buffer of the device.

15. The method of claim 1, wherein the device is a data acquisition device.

16. The method of claim 1, wherein the device and the host computer system are coupled via a serial bus;

wherein said transferring the first data from the host computer system is performed through the serial bus.

17. The method of claim 16, wherein the serial bus comprises a Universal Serial Bus (USB).

18. The method of claim 16, wherein the serial bus comprises an IEEE 1394 bus.

19. The method of claim 16, wherein the serial bus comprises an Ethernet bus.

20. A method for transferring data in a system including a host computer system coupled through a communication medium to a device, wherein the device comprises a first direct memory access (DMA) channel, a second DMA channel, a first buffer, and a second buffer, wherein the first buffer stores first data, the method comprising:

the second DMA channel of the device transferring the first data from the first buffer of the device;

the first DMA channel reading second data from the host computer system;

the first DMA channel storing the second data in the second buffer;

wherein said second DMA channel of the device transferring the first data from the first buffer and said first DMA channel storing the second data in the second buffer are performed concurrently;

the method further comprising:

synchronizing the first DMA channel and the second DMA channel after said second DMA channel of the device transferring the first data from the first buffer and said first DMA channel storing the second data in the second buffer, wherein said synchronizing comprises:

the first DMA channel entering a synchronization point;

the first DMA channel issuing a pause command, thereby pausing itself;

the second DMA channel entering the synchronization point; and the second DMA channel issuing a continue command to the first DMA channel, thereby awakening the first DMA channel;

wherein, after said second DMA channel issuing the continue command to the first DMA channel, the first DMA channel and the second DMA channel are operable to proceed transferring data in a concurrent manner.

21. The method of claim 20, further comprising:

determining if there are more data to read and transfer;

if there are no more data to read and transfer, then terminating said reading and said transferring data.

22. The method of claim 20, further comprising:

the first DMA channel reading third data from the host computer system;

the first DMA channel storing the third data in the first buffer; and the second DMA channel transferring the second data from the second buffer;

wherein said first DMA channel storing the third data in the first buffer and said second DMA channel transferring the second data from the second buffer are performed in a concurrent manner.

23. The method of claim 20, wherein the device is a data acquisition device.

24. The method of claim 20, wherein the communication medium comprises a serial bus.

25. The method of claim 24, wherein the serial bus comprises a Universal Serial Bus (USB).

26. The method of claim 24, wherein the serial bus comprises an IEEE 1394 bus.

27. The method of claim 24, wherein the serial bus comprises an Ethernet bus.

28. A system for transferring data, the system comprising:

a device, comprising:

a first buffer;

a second buffer;

a first direct memory access (DMA) channel; and a second DMA channel; and a host computer system coupled to the device via a communication medium;

wherein the first DMA channel is operable to transfer first data from the host computer system into the first buffer;

wherein the second DMA channel is operable to transfer the first data from the first buffer;

wherein the first DMA channel is further operable to transfer second data from the host computer system into the second buffer concurrently with said second DMA channel transferring the first data from the first buffer;

wherein the first DMA channel is further operable to:

enter a synchronization point;

issue a continue command to the second DMA channel, thereby awakening the second DMA channel if the second DMA channel is paused;

issue a pause command to the first DMA channel, thereby pausing the first DMA channel;

wherein the second DMA channel is further operable to:

enter the synchronization point;

issue a continue command to the first DMA channel, thereby awakening the first DMA channel;

issue a pause command to the second DMA channel, thereby pausing the second DMA channel;

wherein the first DMA channel is further operable to:

issue a continue command to the second DMA channel, thereby awakening the second DMA channel;

wherein, after the first DMA channel issues the continue command to the second DMA channel, the first DMA channel and the second DMA channel are operable to proceed with further data transfers in a concurrent manner.

29. The system of claim 28, wherein the first DMA channel is further operable to:

transfer third data into the first buffer;

wherein the second DMA channel is further operable to:

transfer the second data from the second buffer;

wherein the first DMA channel and the second DMA channel are operable to respectively perform said storing the third data in the first buffer and said transferring the second data from the second buffer in a concurrent manner.

30. The system of claim 29, wherein the device is operable to:

determine if there are more data to transfer from the host computer system; and wherein, in transferring third data into the first buffer, the first DMA channel is operable to perform said transferring third data into the first buffer if there are more data to transfer.

31. The system of claim 28, wherein the second DMA channel is further operable to transfer the second data from the second buffer after completion of said transferring the first data from the first buffer.

32. The system of claim 28, wherein the device is a data acquisition device.

33. The system of claim 28, wherein the communication medium comprises a serial bus.

34. The method of claim 33, wherein the serial bus comprises a Universal Serial Bus (USB).

35. The method of claim 33, wherein the serial bus comprises an IEEE 1394 bus.

36. The method of claim 33, wherein the serial bus comprises an Ethernet bus.

* * * * *